(12) United States Patent
Musha et al.

(10) Patent No.: US 9,702,735 B2
(45) Date of Patent: Jul. 11, 2017

(54) MAGNETIC ROTATION-ANGLE DETECTOR

(71) Applicant: Mitsubishi Electric Corporation, Chiyoda-ku, Tokyo (JP)

(72) Inventors: Takeshi Musha, Chiyoda-ku (JP); Jin Inoue, Chiyoda-ku (JP); Hajime Nakajima, Chiyoda-ku (JP); Takashi Okamuro, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 59 days.

(21) Appl. No.: 14/378,559

(22) PCT Filed: May 21, 2013

(86) PCT No.: PCT/JP2013/064014
§ 371 (c)(1),
(2) Date: Aug. 13, 2014

(87) PCT Pub. No.: WO2013/176104
PCT Pub. Date: Nov. 28, 2013

(65) Prior Publication Data
US 2015/0054499 A1    Feb. 26, 2015

(30) Foreign Application Priority Data
May 22, 2012    (JP) .................. 2012-116754

(51) Int. Cl.
*G01D 5/165* (2006.01)
*G01D 5/245* (2006.01)
(Continued)

(52) U.S. Cl.
CPC .............. *G01D 5/165* (2013.01); *G01B 7/30* (2013.01); *G01D 5/147* (2013.01); *G01D 5/245* (2013.01)

(58) Field of Classification Search
CPC .... G01R 33/0047; G01R 15/20; H02K 29/08; H02K 5/225; G01D 5/145; G01D 5/147; G01P 3/487
See application file for complete search history.

(56) References Cited

U.S. PATENT DOCUMENTS

| 4,599,561 A * | 7/1986 | Takahashi ............. H02K 29/08 324/207.12 |
| 7,923,993 B2 * | 4/2011 | Takahashi ............. F16C 41/007 324/207.25 |

(Continued)

FOREIGN PATENT DOCUMENTS

| JP | 54-155066 A | 12/1979 |
| JP | 58-184668 U | 12/1983 |

(Continued)

OTHER PUBLICATIONS

Communication dated Apr. 21, 2015 from the Japanese Patent Office in counterpart application No. 2014-516799.

(Continued)

*Primary Examiner* — Alesa Allgood
(74) *Attorney, Agent, or Firm* — Sughrue Mion, PLLC; Richard C. Turner

(57) ABSTRACT

Provided is a magnetic rotation-angle detector that includes a disk-shaped magnet that is magnetized so as to change magnetic poles n times per rotation (where n is an integer equal to or larger than 1); a magnetic-body slit plate that is rotated together with the magnet, where a part having a high magnetic flux permeability and a part having a low magnetic flux permeability are alternately and repeatedly arranged thereon so as to change the magnetic flux permeability m times per rotation (where m is an integer equal to or larger than 2 and m>n); a magnetic sensor that detects magnetism from the magnet when the magnet has passed by through the (Continued)

magnetic-body slit plate; and a calculation unit that obtains the rotation angle of the magnet from the output from the magnetic sensor.

4 Claims, 9 Drawing Sheets

(51) Int. Cl.
    *G01D 5/14*     (2006.01)
    *G01B 7/30*     (2006.01)

(56) References Cited

U.S. PATENT DOCUMENTS

| | | |
|---|---|---|
| 2010/0156402 A1 | 6/2010 | Straubinger et al. |
| 2012/0126103 A1 | 5/2012 | Yamamoto |
| 2014/0197823 A1* | 7/2014 | Yoshidomi ............... G01B 7/30 324/207.22 |

FOREIGN PATENT DOCUMENTS

| | | | | |
|---|---|---|---|---|
| JP | 05-052584 | * | 3/1993 | ............. G01D 5/245 |
| JP | 5-52584 A | | 3/1993 | |
| JP | 8-75500 A | | 3/1996 | |
| JP | 2002-139347 A | | 5/2002 | |
| JP | 2003-121200 A | | 4/2003 | |
| JP | 2004-53589 A | | 2/2004 | |
| JP | 2011-33464 A | | 2/2011 | |

OTHER PUBLICATIONS

Communication dated Jul. 22, 2014, issued by the Taiwanese Patent Office in counterpart Application No. 102118019.
International Search Report for PCT/JP2013/064014 dated Jul. 9, 2013 [PCT/ISA/210].
Written Opinion for PCT/JP2013/064014 dated Jul. 9, 2013 [PCT/ISA/237].
Communication dated Oct. 26, 2015 from the Korean Intellectual Property Office issued in counterpart Korean application No. 10-2014-7027719.
Communication dated Apr. 29, 2016 from the Korean Intellectual Property Office issued in corresponding Application No. 10-2014-7027719.

* cited by examiner

MAGNETIC ROTATION-ANGLE DETECTOR

CROSS REFERENCE TO RELATED APPLICATIONS

This application is a National Stage of International Application No. PCT/JP2013/064014, filed on May 21, 2012, which claims priority from Japanese Patent Application No. 2012-116754, filed on May 22, 2012, the contents of all of which are incorporated herein by reference in their entirety.

FIELD

The present invention relates to a magnetic rotation-angle detector.

BACKGROUND

In a magnetic rotation-angle detectors, there is a method of mounting a magnetic body slit, formed by machining a disk-shaped magnetic body such that it has a slit shape, on a motor and then using a magnetic sensor to detect a change in a magnetic field as the magnetic body slit rotates.

Patent Literature 1 describes a technique in which, in a magnetic encoder, a detection body is arranged between a magnetic-body slit plate and a plate magnet, and a plurality of magnetic resistance elements are arranged on the circumference of the detection body, which has a diameter substantially equal to that of the magnetic-body slit plate. According to Patent Literature 1, it is assumed that, because magnetic resistance elements are arranged over the entire circumference of a magnetic-body slit plate, the rotation of the magnetic-body slit plate can be detected while shaft flexures and mounting errors of the rotation parts are cancelled out.

CITATION LIST

Patent Literature

Patent Literature 1: Japanese Patent Application Laid-open No. 2003-121200

SUMMARY

Technical Problem

In the technique described in Patent Literature 1, it is assumed that by arranging a magnetic sensor (a magnetic resistance element) between a magnetic body slit and a plate magnet, the rotation angle of the magnetic body slit can be detected. The magnetic rotation-angle detector using a magnetic body slit as described in Patent Literature 1 is a kind of device referred to as an incremental system, and it is also assume that it detects a relative rotation angle by counting signal changes caused by the rotation of the magnetic-body slit plate.

In the magnetic rotation-angle detector described in Patent Literature 1, in order to detect an absolute rotation angle with high resolution, it is assumed that, for example, signal tracks of a plurality of frequencies need to be provided concentrically on a magnetic-body slit plate (a rotation disk) that uses a magnetic body slit and that a plurality of magnetic resistance elements need to be arranged concentrically on a detection body. In such a case, the area of the rotating disk is increased and the area of the detection body is also increased, and then therefore the size of the magnetic rotation-angle detector may be increased.

The present invention has been achieved in view of the above problems, and an object of the present invention is to provide a magnetic rotation-angle detector that enables downsizing of a configuration for detecting an absolute rotation angle with high resolution.

Solution to Problem

To solve the problem mentioned above and achieve the object, one aspect of the present invention relates to a magnetic rotation-angle detector that includes: a disk-shaped magnet that is magnetized so as to change magnetic poles n times per rotation (where n is an integer equal to or larger than 1); a magnetic-body slit plate that is rotated together with the magnet, where a part having a high magnetic flux permeability and a part having a low magnetic flux permeability are alternately and repeatedly arranged thereon so as to change the magnetic flux permeability m times per rotation (where m is an integer equal to or larger than 2, and m>n); a magnetic sensor that detects magnetism from the magnet when the magnet has passed by through the magnetic-body slit plate; and a calculation unit that obtains a rotation angle of the magnet from an output from the magnetic sensor.

Advantageous Effects of Invention

In the present invention, included are: a disk-shaped magnet that is magnetized so as to change magnetic poles n times per rotation (where n is an integer equal to or larger than 1); a magnetic-body slit plate that is rotated together with the magnet, where a part having a high magnetic flux permeability and a part having a low magnetic flux permeability are alternately and repeatedly arranged thereon so as to change the magnetic flux permeability m times per rotation (where m is an integer equal to or larger than 2, and m>n); a magnetic sensor that detects magnetism from the magnet when the magnet has passed by through the magnetic-body slit plate; and a calculation unit that obtains a rotation angle of the magnet from an output from the magnetic sensor. Therefore, two frequency components can be taken from one magnetic track, and thus a magnetic rotation-angle detector with high resolution can be realized in a small casing. That is, with the magnetic rotation-angle detector, a configuration for detecting an absolute rotation angle with high resolution can be reduced in size.

DESCRIPTION OF EMBODIMENTS

Exemplary embodiments of a magnetic rotation-angle detector according to the present invention will be explained below in detail with reference to the accompanying drawings. The present invention is not limited to the embodiments.

First Embodiment

Figure 1:
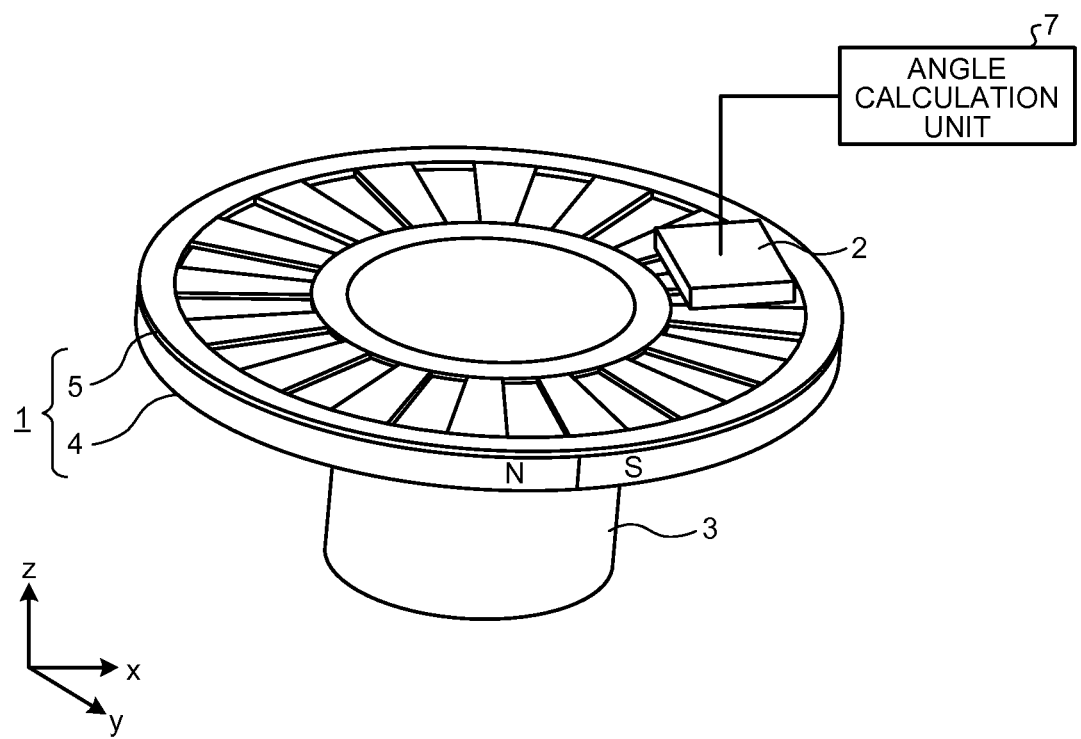
FIG. 1 is a diagram illustrating a configuration of a magnetic rotation-angle detector according to a first embodiment.

FIG. 1 shows an example of a magnetic rotation-angle detector according to a first embodiment of the present invention. A magnet 4 is fixed to a rotating shaft 3, and a magnetic-body slit plate 5 and the magnet 4 integrally constitute a rotating disk 1. For example, each of the magnetic-body slit plate 5 and the magnet 4 is a hollow disk having a hole, which is located near a center thereof and into which the rotating shaft 3 is inserted. The rotating disk 1 is rotated together with the rotating shaft 3. A magnetic sensor 2 fixed to a casing (not shown) is arranged at a position opposing the magnet 4 with the magnetic-body slit plate 5 being interposed therebetween. Even when the rotating disk 1 is rotated, the position of the magnetic sensor 2 does not change. The output from the magnetic sensor 2 changes according to changes in the magnetic field. An angle calculation unit 7 obtains a rotation angle of the rotating disk 1 from an output of the magnetic sensor 2 and outputs the obtained rotation angle.

The rotating disk 1 and the magnetic sensor 2 are arranged with a space therebetween in a direction (z-direction) of the rotation axis of the rotating shaft 3. The space between the rotating disk 1 and the magnetic sensor 2 is determined by taking consideration of the magnetic characteristics of the magnet 4 and the magnetic-body slit plate 5, the sensitivity of the magnetic sensor 2 to a magnetic field change, the limitations of assembling the whole magnetic rotation-angle detector, and the like. Note that although the rotating disk 1 may include a member such as a boss for fastening the rotating disk 1 onto the rotating shaft 3, detailed explanations thereof will be omitted for the first embodiment.

Figure 2:
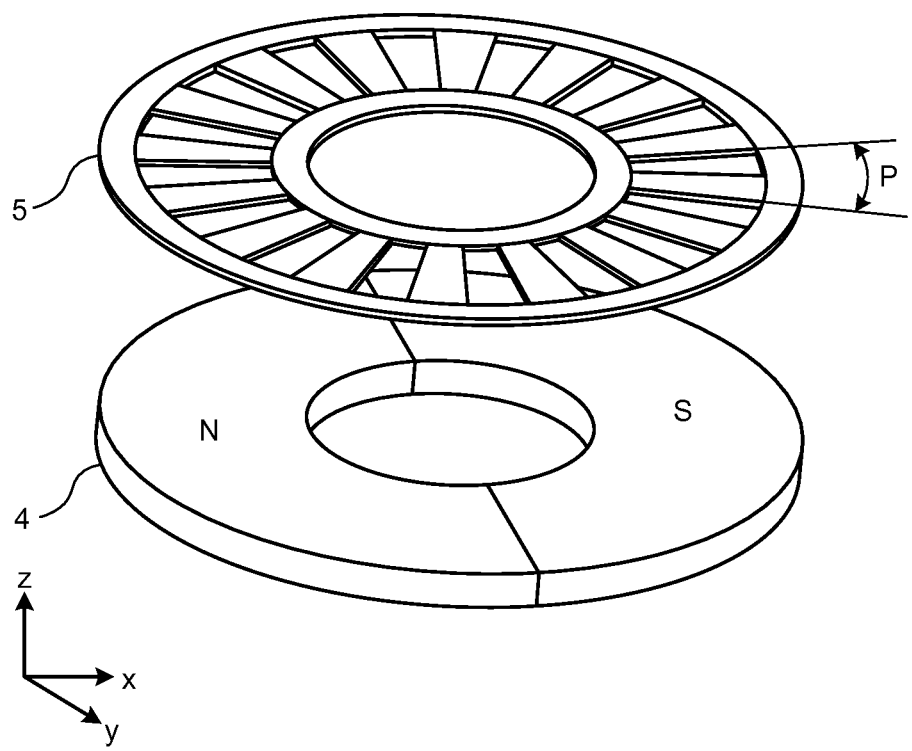
FIG. 2 is a diagram illustrating a configuration of a rotating disk according to the first embodiment.

FIG. 2 is an explanatory diagram of a configuration of the rotating disk 1. The rotating disk 1 is constituted by the magnet 4 and the magnetic-body slit plate 5. While the magnet 4 and the magnetic-body slit plate 5 are separately illustrated in FIG. 2 for convenience of explanation, in practice, the magnet 4 and the magnetic-body slit plate 5 are rotated together as illustrated in FIG. 1. For example, the rotating shaft 3 is inserted into the magnetic-body slit plate 5 and the magnet 4, so the magnetic-body slit plate 5 and the magnet 4 are fixed to the rotating shaft 3, and the magnet 4 and the magnetic-body slit plate 5 rotated together with the rotation of the rotating shaft 3.

The magnetization direction of the magnet 4 is generally referred to as radial magnetization. For example, in FIG. 2, the magnet 4 is in a state where an N pole and an S pole are magnetized in the x-axis direction. When the magnet 4 is rotated with the magnetic-body slit plate 5 removed from the magnetic rotation-angle detector illustrated in FIG. 1 and a magnetic field applied to the magnetic sensor 2 is measured, the magnetic field detected by the magnetic sensor 2 is changed by one period every time the magnet 4 fixed to the rotating shaft 3 is rotated. That is, as the frequency per rotation of the rotating shaft 3 is denoted as n, n represents one magnetic field change.

The magnetic-body slit plate 5 has a disk shape, for example, and is configured so that an opening part and a blocking part are repeatedly arranged for every fixed angle P [rad] in the circumferential direction of the magnetic-body slit plate 5. In the opening part, the magnetic flux of the magnet 4 in the z-axis lower part is transmitted to the z-axis upper part; and in the blocking part, the magnetic flux of the magnet 4 in the z-axis lower part is prevented from being transmitted to the z-axis upper part. Note that even when the opening part is not physically formed in the magnetic-body slit plate 5, it suffices that a part corresponding to the opening part is formed from a member having a high magnetic flux permeability and a part corresponding to the blocking part is formed from a member having a low magnetic flux permeability, and these portions are repeatedly arranged.

According to the example illustrated in FIG. 2, the width of the opening part in the magnetic-body slit plate 5 is equal to the width of the blocking part in the magnetic-body slit plate 5, and the width is approximately P/2 [rad], for example. When the magnetic-body slit plate 5 fixed to the rotating shaft 3 is rotated once, the number of times the magnetic field changes is given by m=2π/P. In the example of FIG. 2, P is equal to 2π/16 [rad], and there are 16 sets of the opening part and the blocking part. That is, as the frequency per rotation of the magnetic-body slit plate 5 fixed to the rotating shaft 3 is denoted as m, m represents 16 magnetic field changes. Note that it is assumed here that m is an integer larger than n.

Figure 3:
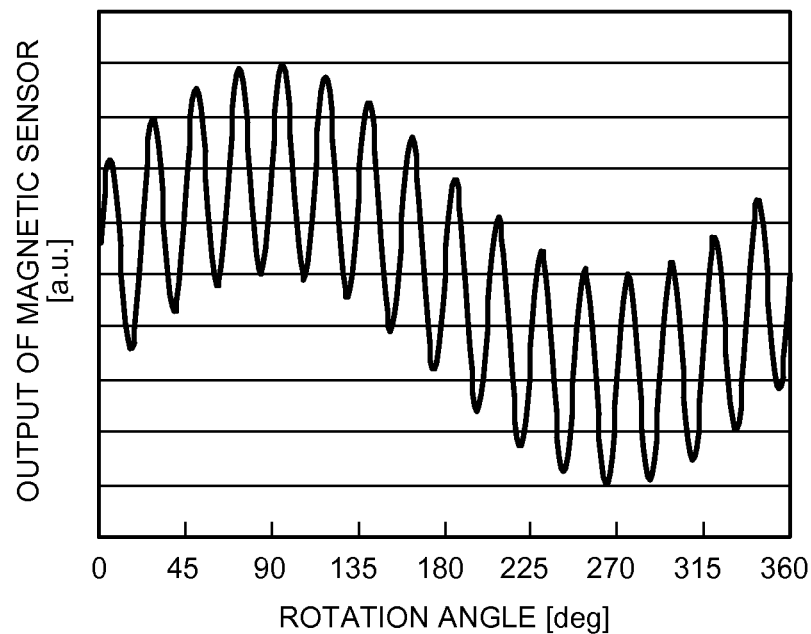
FIG. 3 is a diagram illustrating an example of an output signal of a magnetic sensor according to the first embodiment.

As illustrated in FIG. 1, when the magnetic-body slit plate 5, in which the opening part and the blocking part are repeatedly arranged at a frequency per rotation of the rotating shaft 3 of m=16, is arranged on the magnet 4 that is magnetized at a frequency per rotation of the rotating shaft 3 of n=1 and then the rotating shaft 3 is rotated, as illustrated in FIG. 3, the intensity of the magnetic field measured by the magnetic sensor 2 is represented by a waveform in which a fine magnetic field change having a frequency of m=16 is superimposed on a large magnetic field change having a frequency of n=1 per rotation.

Explained here is a method of separating a signal, in which two frequency components n=1 and m=16 are superimposed on each other and are outputs from the magnetic sensor 2 as illustrated in FIG. 3, into two frequency components n=1 and m=16.

Figure 4:
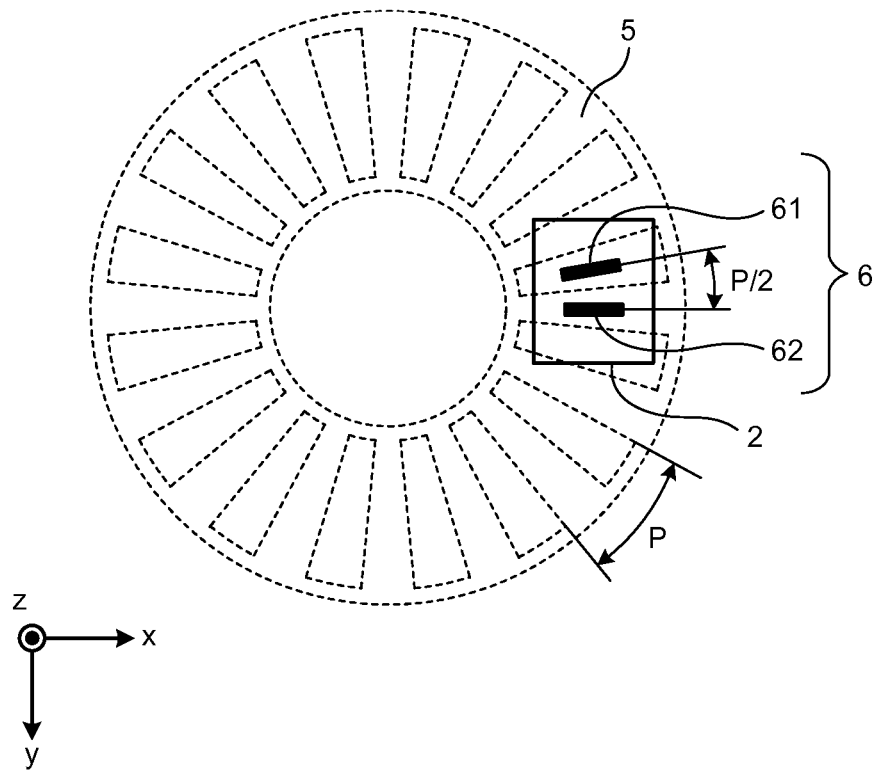
FIG. 4 is a diagram illustrating positions of a magnetic-body slit plate and the magnetic sensor according to the first embodiment.

FIG. 4 shows a diagram illustrating the magnetic-body slit plate 5 and the magnetic sensor 2 illustrated in FIG. 1 as viewed from above in the z-axis direction. The magnetic-body slit plate 5 is illustrated by a broken line for convenience of explanation. The magnetic sensor 2 is constituted by a magnetic detection element group 6 arranged in an array. In FIG. 4, the magnetic detection element group 6 is constituted by two magnetic detection elements 61 and 62 arranged with a space of P/2 [rad] therebetween. In this case, the output of the magnetic detection element 61 is denoted as $F_1(\theta)$ and the output of the magnetic detection element 62 is denoted as $F_2(\theta)$. These outputs are represented by the following equation (1).

[Equation 1]

$$F_1(\theta) = A_1 \sin(n\theta) + B_1 \sin(m\theta)$$
$$F_2(\theta) = A_2 \sin(n(\theta+P/2)) + B_2 \sin(m(\theta+P/2)) \quad (1)$$

$F_1(\theta)$ and $F_2(\theta)$, which are outputs of the magnetic sensor 2, are input to the angle calculation unit 7. Because $P/2=\pi/m$ holds, the relation represented by the following equation (2) is established.

[Equation 2]

$$\begin{aligned}\sin(m(\theta+P/2)) &= \sin(m\theta)\cos(mP/2) + \cos(m\theta)\sin(mP/2) \\ &= \sin(m\theta)\cos(\pi) + \cos(m\theta)\sin(\pi) \\ &= -\sin(m\theta)\end{aligned} \quad (2)$$

Assuming that $A_1=A_2$ and $B_1=B_2$, $F_1(\theta)+F_2(\theta)$ is represented by the following equation (3).

[Equation 3]

$$\begin{aligned}F_1(\theta) + F_2(\theta) &= \{A_1\sin(n\theta) + B_1\sin(m\theta)\} + \\ &\quad \{A_2\sin(n(\theta+P/2)) + B_2\sin(m(\theta+P/2))\} \\ &= \{A_1\sin(n\theta) + B_1\sin(m\theta)\} + \\ &\quad \{A_1\sin(n(\theta+P/2)) - B_2\sin(m\theta)\} \\ &= A_1\sin(n\theta) + A_1\sin(n(\theta+P/2)) \\ &= 2A_1\sin(n(\theta+P/4))\cos(nP/4) \\ &= 2A_1\sin(n(\theta+\pi/(2m)))\cos(n\pi/(2m))\end{aligned} \quad (3)$$

Figure 5:
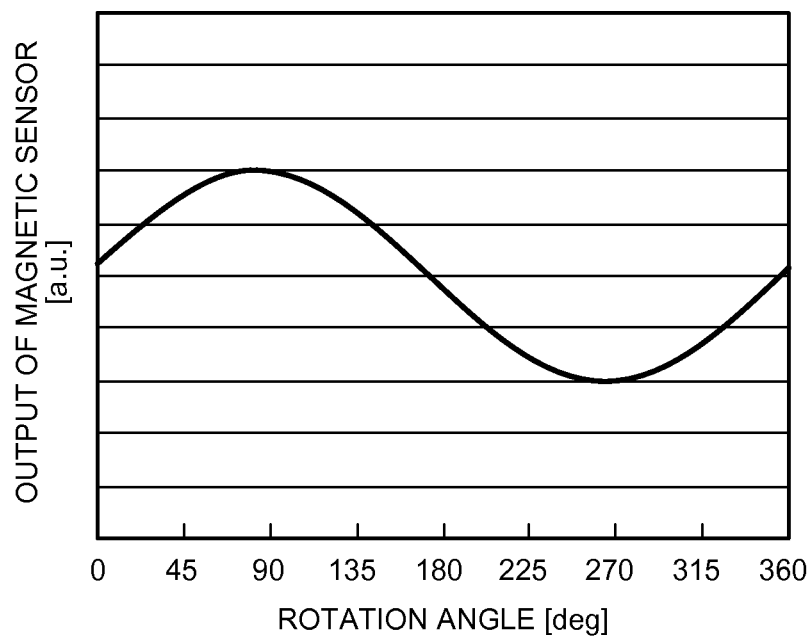
FIG. 5 is a diagram illustrating a signal waveform obtained by an angle calculation unit according to the first embodiment.

That is, an $m\theta$ component that is a periodic variation component of a frequency m is removed from $F_1(\theta)+F_2(\theta)$, so a sine wave consisting only of an $n\theta$ component that is a periodic variation component of a frequency n is obtained. How $F_1(\theta)+F_2(\theta)$ is illustrated in FIG. 5.

Furthermore, gain adjustment is performed in the angle calculation unit 7 so that the amplitude of a signal obtained by evaluating $F_1(\theta)+F_2(\theta)$ is $A_2$, and the result of the gain adjustment is subtracted from $F_2(\theta)$. As a result, as represented by the following equation (4), a sine wave output consisting of the $m\theta$ component that is a periodic variation component of the frequency m can be obtained.

[Equation 4]

$$\begin{aligned}&F_2(\theta) - \{F_1(\theta)+F_2(\theta)\}*A_2/\{2A_1/\cos(n\pi/(2m))\} = \\ &A_2\sin(n(\theta+P/2)) + B_2\sin(m(\theta+P/2)) - A_2\sin(n(\theta+\pi/(2m))) = \\ &B_2\sin(m(\theta+\pi/m)) + A_2\{\sin(n(\theta+\pi/m)) - \sin(n(\theta+\pi/(2m)))\}\end{aligned} \quad (4)$$

Figure 6:
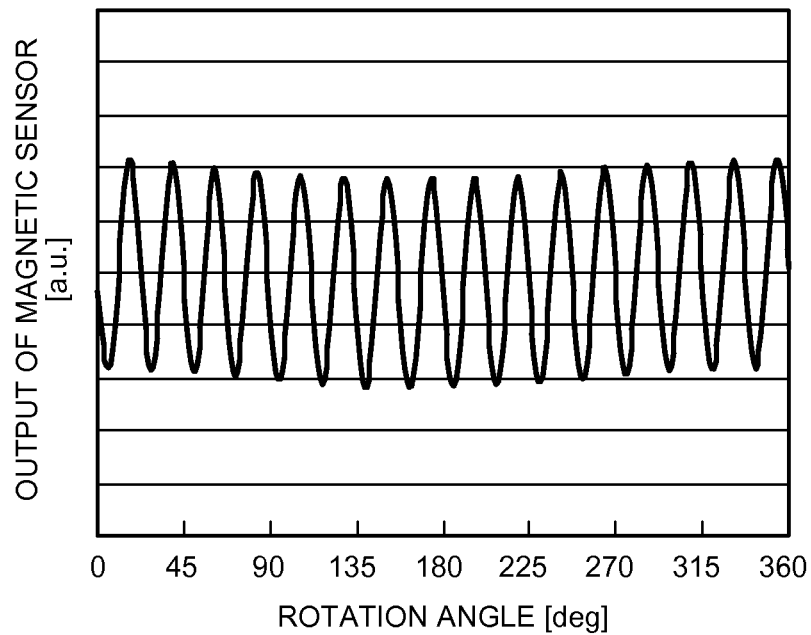
FIG. 6 is a diagram illustrating a signal waveform obtained by the angle calculation unit according to the first embodiment.

While the frequency component $n\theta$ remains in the output, if the difference between n and m is large, the $n\theta$ component is reduced. The appearance of a signal represented by the equation (4) is illustrated in FIG. 6.

With these processes, two signals, one of frequency n and one of frequency m can be taken from one track. For example, in the case of n=1, it is possible to detect the position of the rotating disk 1 rotating with the rotating shaft 3 from a signal of the frequency n. Furthermore, it is possible to detect the position with higher resolution from a signal of the frequency m. Therefore, by the signals of the frequency n and the frequency m, an absolute position of the rotating disk 1 can be detected with high precision. In this manner, according to the present embodiment, two frequency components can be taken from one magnetic track, and thus a magnetic rotation-angle detector with high resolution can be realized in a small casing. That is, in the magnetic rotation-angle detector, a configuration for detecting an absolute rotation angle with high resolution can be downsized.

Note that although the first embodiment contains a description of an example where n=1 and m=16, the values of n and m are not limited thereto, and any integer that is equal to or larger than 1 and that satisfies m>n can be applied. While an absolute position of the rotating disk 1 can be detected in the case of n=1, for example, in a case of n=2, it is possible to detect that the position of the rotating disk 1 is at one of two points that are rotationally symmetric.

While the first embodiment contains an explanation of an example where taking out periodic variation components of frequency n and frequency m by using positions where the magnetic detection elements 61 and 62 are arranged and a calculation process of the angle calculation unit 7, the present invention is not limited to this separation method. For example, it is also possible to have a configuration that has only one magnetic detection element provided, a component of the frequency n and a component of the frequency m are separated from each other in the angle calculation unit 7 after a Fourier transform process has been performed, and then a sinusoidal waveform of the frequency n and a sinusoidal waveform of the frequency m are obtained by performing an inverse Fourier transform process.

Second Embodiment

Figure 7:
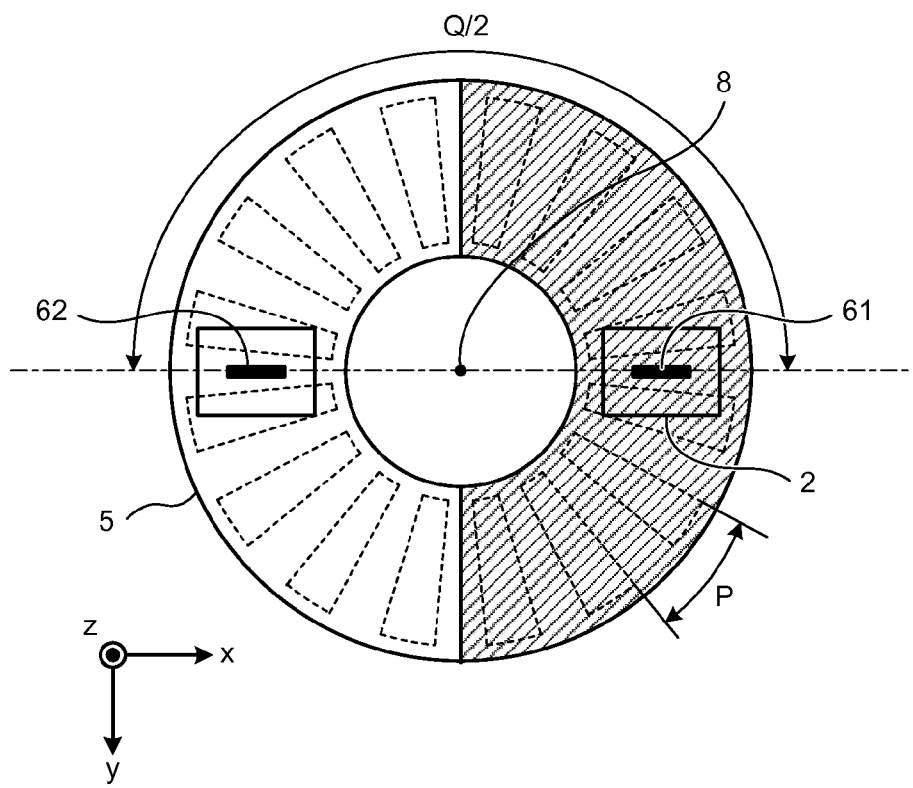
FIG. 7 is a diagram illustrating positions of a magnetic-body slit plate and a magnetic sensor according to a second embodiment.

A configuration of a magnetic rotation-angle detector according to a second embodiment of the present invention is explained with reference to FIG. 7. FIG. 7 is an explanatory diagram of a positional relation between the magnetic-body slit plate 5 and the magnetic sensor 2 in the magnetic rotation-angle detector according to the second embodiment. If FIG. 7 is compared to FIG. 4, which shows the positional relation between the magnetic-body slit plate 5 and the magnetic sensor 2 according to the first embodiment, these drawings are identical to each other except for the positions where the magnetic detection elements 61 and 62 of the magnetic sensor 2 are arranged. Furthermore, in FIG. 7, the hatched portion indicates that there is an S pole of the magnet 4 under the magnetic-body slit plate 5, and the magnetic-body slit plate 5 is rotated about a rotation axis 8 of the rotating shaft 3. According to the second embodiment, as illustrated in FIG. 7, the magnetic detection elements 61 and 62 are set to form an angle of 180° with respect to the rotation axis 8. When the frequency n of magnetization of the magnet 4 is equal to or larger than 2, the magnetic detection elements 61 and 62 are arranged with a space of Q/2 therebetween, where the magnetization pitch of the magnet 4 is Q ($Q=2\pi/n$).

Here, if it is assumed that the output from the magnetic detection element 61 is denoted as $F_1(\theta)$ and the output from the magnetic detection element 62 is denoted as $F_2(\theta)$, these outputs are represented by the following equation (5).

[Equation 5]

$$F_1(\theta) = A_1 \sin(n\theta) + B_1 \sin(m\theta)$$

$$F_2(\theta) = A_2 \sin(n(\theta + Q/2)) + B_2 \sin(m(\theta + Q/2)) \quad (5)$$

$F_1(\theta)$ and $F_2(\theta)$, which are outputs from the magnetic sensor 2, are input to the angle calculation unit 7 (see FIG. 1). As $Q/2$ is equal to $\pi/n$, the relation represented by the following equation (6) is established.

[Equation 6]

$$\begin{aligned}\sin(n(\theta + Q/2)) &= \sin(n\theta)\cos(nQ/2) + \cos(n\theta)\sin(nQ/2) \\ &= \sin(n\theta)\cos(\pi) + \cos(n\theta)\sin(\pi) \\ &= -\sin(n\theta)\end{aligned} \quad (6)$$

As it is assumed that $A_1 = A_2$ and $B_1 = B_2$, $F_1(\theta) + F_2(\theta)$ is represented by the following equation (7).

[Equation 7]

$$\begin{aligned}F_1(\theta) + F_2(\theta) &= \{A_1\sin(n\theta) + B_1\sin(m\theta)\} + \\ &\quad \{A_2\sin(n(\theta + Q/2)) + B_2\sin(m(\theta + Q/2))\} \\ &= \{A_1\sin(n\theta) + B_1\sin(m\theta)\} + \\ &\quad \{-A_1\sin(n\theta) + B_1\sin(m(\theta + Q/2))\} \\ &= B_1\sin(m\theta) + B_1\sin(m(\theta + Q/2)) \\ &= 2B_1\sin(m(\theta + Q/4))\cos(nQ/4) \\ &= 2B_1\sin(m(\theta + \pi/(2n)))\cos(n\pi/(2n))\end{aligned} \quad (7)$$

Figure 8:
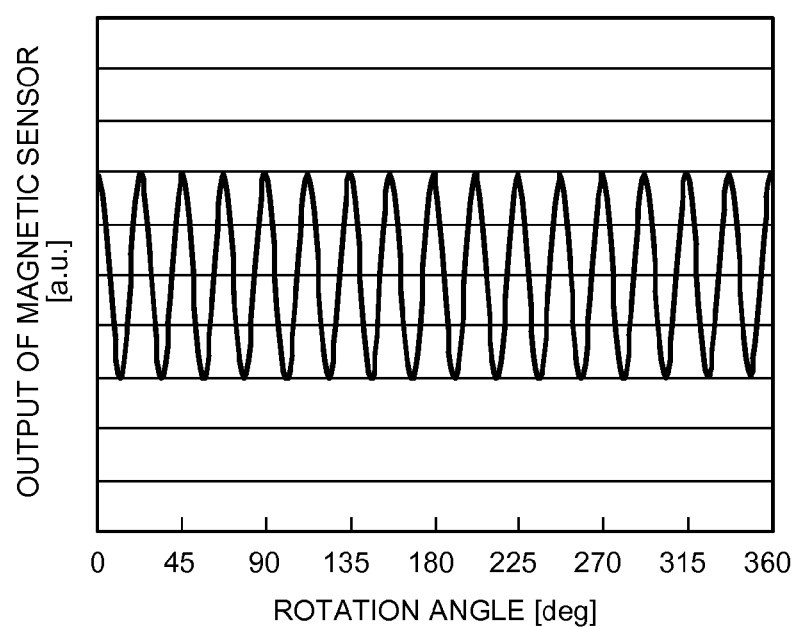
FIG. 8 is a diagram illustrating a signal waveform obtained by an angle calculation unit according to the second embodiment.

That is, an $n\theta$ component that is a periodic variation component of the frequency n is removed from $F_1(\theta)+F_2(\theta)$, so that a sine wave consisting of only an $m\theta$ component that is a periodic variation component of the frequency m can be obtained. The trace of $F_1(\theta)+F_2(\theta)$ is illustrated in FIG. 8.

Here, when the relation between m and n is limited to $m=n\times 2k$ (k is a natural number), $F_2(\theta)$ is represented by the following equation (8).

[Equation 8]

$$\begin{aligned}F_2(\theta) &= A_2\sin(n(\theta + Q/2)) + B_2\sin(m(\theta + Q/2)) \\ &= A_2\sin(n\theta + n\pi/n) + B_2\sin(m\theta + m\pi/n) \\ &= A_2\sin(n\theta + \pi) + B_2\sin(m\theta + 2^k\pi) \\ &= -A_2\sin(n\theta) + B_2\sin(m\theta)\end{aligned} \quad (8)$$

Accordingly, the gain and the phase of the output of $F_1(\theta)+F_2(\theta)$ are adjusted to take out a value of $\sin(m\theta)$ and then this value is subtracted from $F_2(\theta)$. As a result, a sine wave consisting of only the $n\theta$ component, which is a periodic variation component of the frequency n, can be obtained.

According to the magnetic rotation-angle detector of the second embodiment, as compared to the magnetic rotation-angle detector according to the first embodiment, two signals, one of frequency n and one of frequency m can be separated from each other with higher precision (for example, the two signals can be separated completely) and taken out.

Third Embodiment

Figure 9:
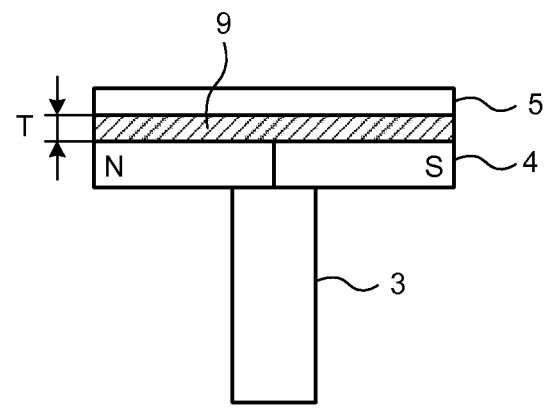
FIG. 9 is a diagram illustrating a configuration of a magnetic rotation-angle detector according to a third embodiment.

FIG. 9 is a side view of a magnetic rotation-angle detector according to a third embodiment of the present invention. The basic configuration of the present embodiment is substantially identical to those of the magnetic rotation-angle detector according to the first second embodiments, except for a difference in that a non-magnetic body spacer 9 having a thickness T is provide between the magnet 4 and the magnetic-body slit plate 5. For example, the spacer 9 is a hollow disk having a hole, which is located near a center thereof and into which the rotating shaft 3 is inserted. The spacer 9 is rotated together with the magnet 4 and the magnetic-body slit plate 5. For example, by inserting the rotating shaft 3 into the magnetic-body slit plate 5, the spacer 9, and the magnet 4, respectively, the magnetic-body slit plate 5, the spacer 9, and the magnet 4 are fixed to the rotating shaft 3, and the magnet 4, the spacer 9, and the magnetic-body slit plate 5 are rotated together along with the rotation of the rotating shaft 3.

Figure 10:
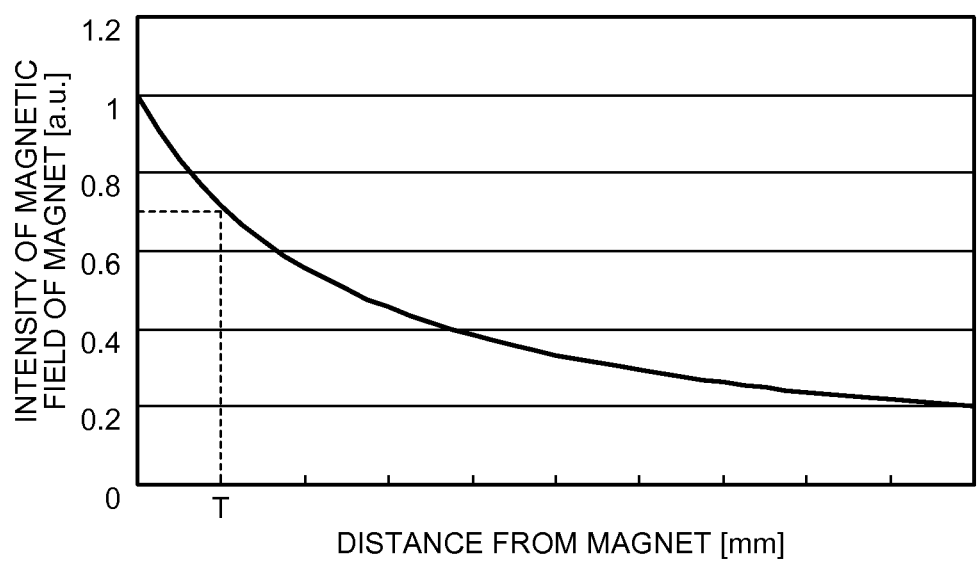
FIG. 10 is a diagram illustrating a relation between the intensity of magnetic field and the distance from a magnet in the magnetic rotation-angle detector according to the third embodiment.

Next, the present embodiment is explained in detail with reference to FIG. 10. Assuming that the intensity of the magnetic field on a surface of the magnet 4 (a surface opposing the magnetic-body slit plate 5) generated by the magnet 4 is 1 , the intensity of the magnetic field at a position located away from the magnet 4 generated by the magnet 4 decreases inversely proportional to the square of the distance from the magnet 4.

According to the first and second embodiments, a magnetic modulation is generated by a magnetic body slit at a vicinity near to a point having the largest magnetic field on the surface of the magnet 4 (a surface of the magnet 4 opposing the magnetic-body slit plate 5). When the thickness of the magnetic-body slit plate 5 is thin and the intensity of the magnetic field of the magnet 4 is large, it is assumed to be a case where the magnetic-body slit plate 5 is magnetically saturated and thus the modulation of the magnetic field caused by a magnetic body slit responding to a change in the magnetic field due to the magnet 4 cannot be sufficiently obtained.

According to the present embodiment, the non-magnetic body spacer 9 is provided between the magnet 4 and the magnetic-body slit plate 5, and the modulation of the magnetic field caused by a magnetic body slit is applied at a position that is the thickness T of the spacer away from the magnet 4. Therefore due to this configuration, when the intensity of the magnetic field of the magnet 4 is large, magnetic saturation of the magnetic-body slit plate 5 can be reduced, and the modulation of the magnetic field caused by the magnetic body slit can be performed sufficiently (at a level satisfying required performances) with respect to a change in the magnetic field of the magnet 4.

While the present embodiment exemplifies a case of setting the thickness T of the spacer such that the modulation of a magnetic field is performed by a magnetic body slit at a position where the intensity of the magnetic field of the magnet 4 is 0.7 , the thickness T of the spacer can be set arbitrarily according to the required performances.

For example, by using the method of the present embodiment, an output ratio of a sinusoidal waveform of the frequency n and a sinusoidal waveform of the frequency m can be set arbitrarily, and therefore the calculation processing ability of the angle calculation unit 7 can be improved and a rotation-angle detector with higher reliability can be provided.

Fourth Embodiment

Figure 11:
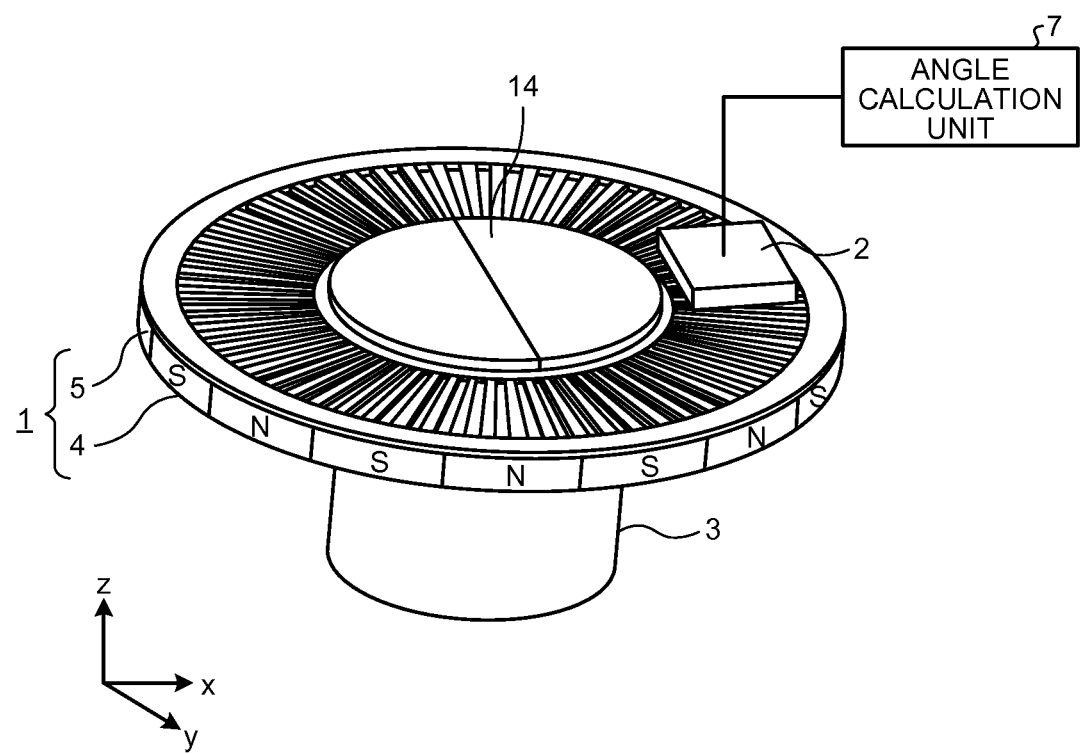
FIG. 11 is a diagram illustrating a configuration of a magnetic rotation-angle detector according to a fourth embodiment.

FIG. 11 shows an example of a magnetic rotation-angle detector according to a fourth embodiment of the present invention. If FIG. 11 is compared to FIG. 1, which shows the magnetic rotation-angle detector according to the first embodiment of the present invention, these magnetic rotation-angle detectors are essentially identical to each other except for one difference in that a magnet 14 rotating together with the rotating shaft 3 is provided at a central part of the rotating disk 1. The magnet 4, the magnetic-body slit plate 5, and the magnet 14 are rotated together with the rotating shaft 3.

Figure 12:
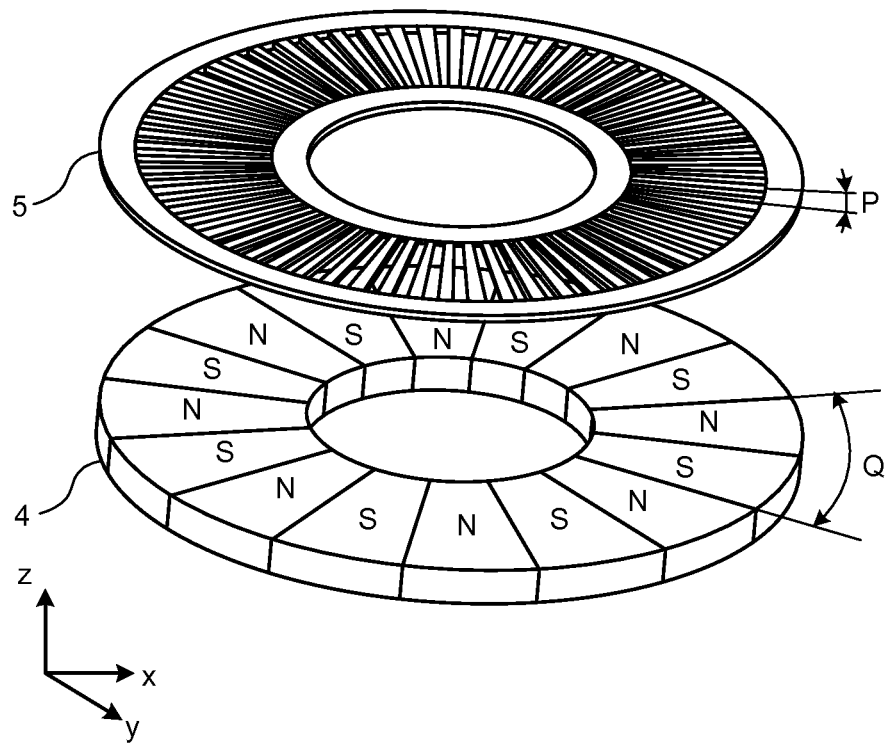
FIG. 12 is a diagram illustrating a configuration of a rotating disk according to the fourth embodiment.

FIG. 12 is an explanatory diagram of a configuration of the rotating disk 1. The rotating disk 1 is constituted by the magnet 4 and the magnetic-body slit plate 5. While the magnet 4 and the magnetic-body slit plate 5 are illustrated as a separate structure, as illustrated in FIG. 12 for convenience of explanation, in practice, the magnet 4 and the magnetic-body slit plate 5 are rotated together as illustrated in FIG. 11.

The magnet 4 is formed such that a magnetic field change occurs n=8 times per rotation of the rotating shaft 3, and the magnetic-body slit plate 5 is formed such that a magnetic field change occurs m=128 times per rotation of the rotating shaft 3. Furthermore, the magnet 14 is formed such that a magnetic field change occurs l=1 time per rotation of the rotating shaft 3. Therefore, a magnetic field applied to the magnetic sensor 2 has a waveform where a magnetic field change in which a fine change having a frequency of m=128 is superimposed on a large change having a frequency of n=8, which occurs per rotation of the rotating shaft, and has a large change having a frequency of l=1 that is further superimposed on the waveform.

As a method of separating such an output as above, similarly to the first embodiment, the magnetic detection element 61 and the magnetic detection element 62 are arranged in the magnetic sensor 2 with a space of P/2 therebetween, so that an output having a component with a rotation period of m removed therefrom can be obtained. Alternatively, the magnetic detection element 61 and the magnetic detection element 62 are arranged with a space of Q/2 therebetween, as in the second embodiment, so that an output having a component with a rotation period of n removed therefrom can be obtained. Respective frequency components can then be separated from each other with a Fourier conversion process and the like.

As explained above, signals of three different frequency components can be taken out by using only one magnetic track; therefore, downsizing and high resolution can be achieved at the same time.

Fifth Embodiment

Figure 13:
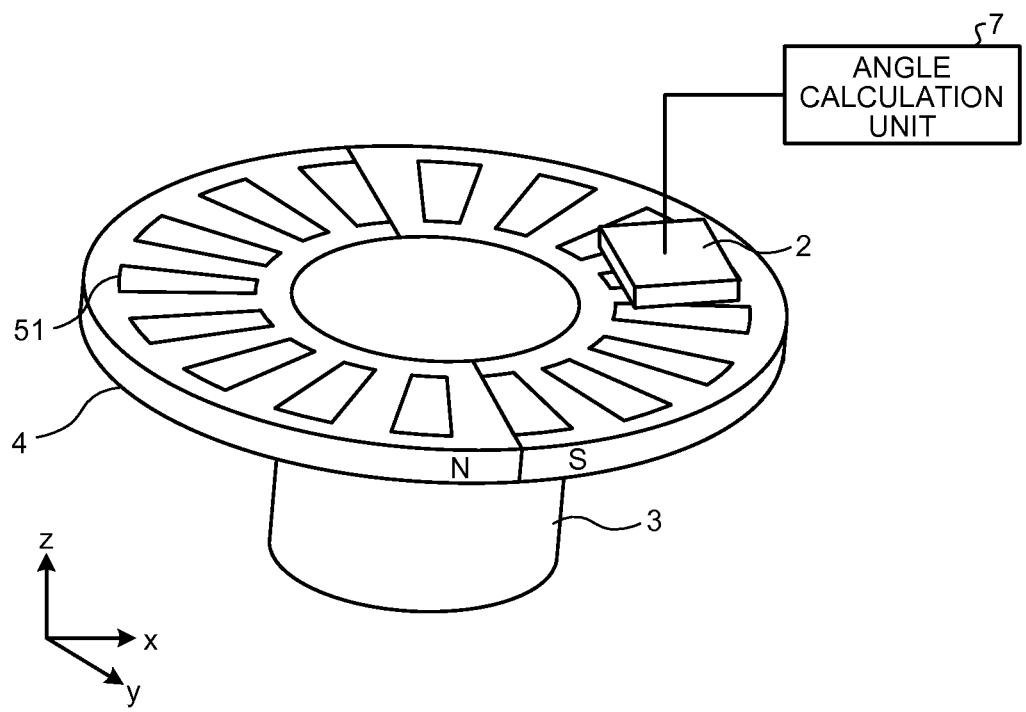
FIG. 13 is a diagram illustrating a configuration of a magnetic rotation-angle detector according to a fifth embodiment.

FIG. 13 shows an example of a magnetic rotation-angle detector according to a fifth embodiment of the present invention. If FIG. 13 is compared to FIG. 1, which shows the magnetic rotation-angle detector according to the first embodiment of the present invention, these magnetic rotation-angle detectors are identical to each other except for a difference in that, in FIG. 13, a magnetic-body slit plate 51 is used instead of the magnetic-body slit plate 5.

According to the first embodiment, the magnetic-body slit plate 5 is formed separately from the magnet 4 and arranged to be integrated with the magnet 4. According to the fifth embodiment, the magnetic-body slit plate 51 is formed on the magnet 4 by printing using a magnetic ink or the like. Accordingly, when compared to a case of integrating the magnetic-body slit plate 5 with the magnet 4 by an adhesive or the like, there is less possibility of the magnetic-body slit plate 51 peeling away when rotating at high speed when at a high temperature, and thus a magnetic rotation-angle detector with higher reliability can be obtained.

INDUSTRIAL APPLICABILITY

As described above, the magnetic rotation-angle detector according to the present invention is useful for detecting a rotation angle of a magnetic-body slit plate.

REFERENCE SIGNS LIST 2 magnetic sensor, 4 magnet, 5, 51 magnetic-body slit plate, 7 angle calculation unit.

The invention claimed is:

1. A magnetic rotation-angle detector comprising:
   a magnetic sensor in which magnetic detection elements are arranged with a space of $\pi/n$ [rad], where n is an integer equal to or larger than 1; or $\pi/m$ [rad], where m is an integer equal to or larger than 2, and m>n therebetween and that separates and takes a signal of a rotation period of m or a rotation period of n from a magnetic field change in which the rotation period of m and the rotation period of n are superimposed;
   a rotating disk-shaped magnet that is magnetized so as to present, to the magnetic sensor, a complete 360 degree cycle of magnetic polarity change n times per rotation;
   a unit, comprising a magnetic-body slit plate that is rotated together with the magnet, that generates a magnetic filed change in which a rotation period of m and a rotation period of n are superimposed per rotation of the unit, the magnetic-body slit plate that is rotated together with the magnetic-body slit plate being provided with a part having a high magnetic flux permeability and a part having a low magnetic flux permeability that are alternately and repeatedly arranged thereon, so as to cycle a magnetic flux permeability m times per rotation; and
   a calculator unit that separates a signal component having a frequency of n and a signal component having a frequency of m from an output from the magnetic sensor and obtains a rotation angle of the magnet.

2. The magnetic rotation-angle detector according to claim 1, wherein
   a non-magnetic body spacer is provided between the magnet and the magnetic-body slit plate, and
   a fixed space is provided between the magnet and the magnetic-body slit plate.

3. The magnetic rotation-angle detector according to claim 1,
   further comprising a disk-shaped second magnet that is provided on an inner side of the magnet and that is magnetized so as to present, to the magnetic sensor, a complete 360 degree cycle of magnetic polarity k times per rotation, where k is an integer equal to or larger than 1, and k<n.

4. The magnetic rotation-angle detector according to claim 1, wherein
   the magnetic-body slit plate is formed by printing a magnetic ink on a surface of the magnet.

* * * * *